(12) United States Patent
Sausset et al.

(10) Patent No.: US 11,754,584 B2
(45) Date of Patent: Sep. 12, 2023

(54) BEARING AND ASSOCIATED SENSOR BEARING UNIT

(71) Applicant: Aktiebolaget SKF, Gothenburg (SE)

(72) Inventors: Vincent Sausset, Azay-le-Rideau (FR); Yves-André Liverato, Saint Paterne Racan (FR); Sylvain Chaussat, Mont-Pres-Chambord (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/721,959

(22) Filed: Apr. 15, 2022

(65) Prior Publication Data

US 2022/0349913 A1 Nov. 3, 2022

(30) Foreign Application Priority Data

Apr. 28, 2021 (DE) .......................... 102021204198.1

(51) Int. Cl.
*F16C 19/06* (2006.01)
*F16C 33/58* (2006.01)
*F16C 41/00* (2006.01)
*G01P 3/44* (2006.01)
*G01P 3/487* (2006.01)

(52) U.S. Cl.
CPC .............. *G01P 3/443* (2013.01); *F16C 19/06* (2013.01); *F16C 33/581* (2013.01); *F16C 33/586* (2013.01); *F16C 41/007* (2013.01); *G01P 3/487* (2013.01); *F16C 2226/12* (2013.01)

(58) Field of Classification Search
CPC ...... F16C 19/06; F16C 33/581; F16C 33/583; F16C 33/586; F16C 35/063; F16C 35/077; F16C 41/007; F16C 2226/12; G01P 3/443; G01P 3/487
See application file for complete search history.

(56) References Cited

U.S. PATENT DOCUMENTS

| | | | |
|---|---|---|---|
| 5,242,229 A * | 9/1993 | McLarty | F16C 33/7879 384/477 |
| 9,494,196 B2 * | 11/2016 | Sausset | G01P 3/443 |
| 2006/0170414 A1 * | 8/2006 | Vignotto | G01P 3/443 324/174 |
| 2018/0128320 A1 * | 5/2018 | Chaussat | G01D 5/12 |

FOREIGN PATENT DOCUMENTS

| | | | | |
|---|---|---|---|---|
| CN | 112178056 A * | 1/2021 | .............. | F16C 19/16 |
| DE | 102019127241 A1 * | 4/2021 | | |
| FR | 2697597 A1 * | 5/1994 | ............ | F16C 33/583 |
| FR | 2884367 B1 | 9/2007 | | |
| FR | 3052202 B1 | 11/2018 | | |
| JP | 2007232222 A * | 9/2007 | .............. | F16C 19/52 |

* cited by examiner

*Primary Examiner* — Phillip A Johnson
(74) *Attorney, Agent, or Firm* — GARCIA-ZAMOR INTELLECTUAL PROPERTY LAW, LLC; Ruy Garcia-Zamor

(57) ABSTRACT

The bearing provides a first ring and a second ring centered on an axis, each of the first and second rings being provided with an outer cylindrical surface, with an inner cylindrical surface, and with lateral faces that axially delimit the outer and inner cylindrical surface. One of the inner and outer cylindrical surfaces and/or one of the lateral faces of the first ring includes a textured area provided with a groove extending circumferentially and with two protrusions disposed one on each side of the groove and extending along the groove.

12 Claims, 4 Drawing Sheets

BEARING AND ASSOCIATED SENSOR BEARING UNIT

CROSS-REFERENCE TO RELATED APPLICATIONS

This application claims priority to German Patent Application no. 102021204198.1, filed Apr. 28, 2021, the contents of which is fully incorporated herein by reference

TECHNICAL FIELD OF THE INVENTION

The present invention relates to a bearing. The present invention more particularly relates to a sensor bearing unit comprising a bearing and an impulse ring.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring is provided with a target holder and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing.

In a first type of impulse ring, the target holder comprises a flange provided with an outer tubular portion onto which the magnetic target is attached, and with an inner tubular portion secured into an annular groove made in the bore of the inner ring in order to prevent the rotation of the impulse ring relative to the inner ring. For more details, it is possible for example to refer to the patent FR 2 884 367.

In a second type of impulse ring, the target holder of the impulse ring is further provided with a fixing sleeve supporting the flange and secured to the inner ring. The sleeve comprises an annular axial portion secured into the annular groove of the inner ring and a radial collar extending radially outwards the axial portion, the flange being axially mounted between the inner ring of the bearing and the radial collar of the sleeve.

Similarly, to the first type of impulse ring, the axial portion of the sleeve is secured into the annular groove of the inner ring in order to prevent the rotation of the impulse ring relative to the inner ring.

It is essential that the impulse ring is fixedly connected in rotation with the bearing inner ring to which it is attached.

In some cases, due to high speeds, thermal dilatation or high mechanical loads, there is a significant risk that the angular mechanical connection between the impulse ring and the inner ring holding it becomes partially or totally loose, permanently or randomly. Should such a failure occur, the signal measured by the detection means would not correspond to the real position or speed or acceleration of the inner ring of the bearing with respect to the outer ring.

Therefore, there is a need to provide a sensor bearing unit with improved angular connection between the impulse ring and the associated bearing inner ring.

More generally, there is also a need to provide a bearing adapted to enhance the angular connection with an additional part intended to be mounted on the inner or outer ring.

SUMMARY OF THE INVENTION

The invention relates to a bearing comprising a first ring and a second ring centered on an axis, each of the first and second rings being provided with an outer cylindrical surface, with an inner cylindrical surface, and with lateral faces which axially delimit the outer and inner cylindrical surface.

According to a general feature, one of the inner and outer cylindrical surfaces and/or one of the lateral faces of the first ring comprise a textured area provided with a groove extending circumferentially and with two protrusions disposed one on each side of the groove and extending along the groove.

A "texture area" means a part that has different surface-state features from the rest of the associated cylindrical surface or lateral face.

In a first embodiment, only the inner or outer cylindrical surface of the first ring comprises a textured area.

In a second alternative embodiment, only one of the lateral faces of the first ring comprise a textured area.

In a third alternative embodiment, both one of the inner and outer cylindrical surfaces and one of the lateral faces of the first ring are provided with a textured area.

With such texture area provided on one of the lateral face and/or one of the cylindrical surfaces of the first ring, the angular connection with the additional part intended to be mounted on this ring is improved. As a matter of fact, the breaking torque between the additional part and the first ring increases with the protrusions of the texture area which extend circumferentially along the groove.

Advantageously, the textured area is formed by local deformation of the cylindrical surface or the lateral face, for example by laser. In this case, the first ring is provided with a laser texture area.

The textured area may have a sinusoidal shape extending circumferentially.

The height of the protrusions of the textured area may range between 10 µm and 50 µm, and preferably between 15 µm and 38 µm. The width of the protrusions may range between 10 µm and 40 µm, and preferably between 15 µm and 35 µm.

Preferably, the space between the protrusions, at their top, is less than or equal to 60 µm. With such a spacing, the material embrittlement of the first ring is limited.

The invention also relates to a sensor bearing unit comprising a bearing as previously defined and an impulse ring provided with a target holder and with a target mounted on the target holder. The target holder is axially mounted against the lateral face of the first ring and comprises an axial fixing portion secured to the first ring and coming into radial contact with the cylindrical surface of the first ring.

In a first embodiment, the target holder of the impulse ring comprises at least a flange onto which is mounted the target, the flange comprising an axial portion forming the axial fixing portion of the target holder.

The flange of the target holder may further comprise a radial portion extending at least radially the axial portion and coming into axial contact with the lateral face of the first ring.

In a second embodiment, the flange of the target holder further comprises a radial portion extending radially the axial portion, the target holder further comprising a washer axially interposed between the radial portion of the flange and the lateral face of the first ring.

In a third embodiment, the target holder of the impulse ring comprises at least a flange onto which is mounted the target and a sleeve, the sleeve comprising an axial portion forming the axial fixing portion of the target holder, the flange being axially interposed between the lateral face of the first ring and the sleeve and being radially mounted around the sleeve.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of a specific embodiment given by way of a non-limiting example and illustrated by the appended drawings on which.

DETAILED DESCRIPTION OF THE INVENTION

Figure 1:
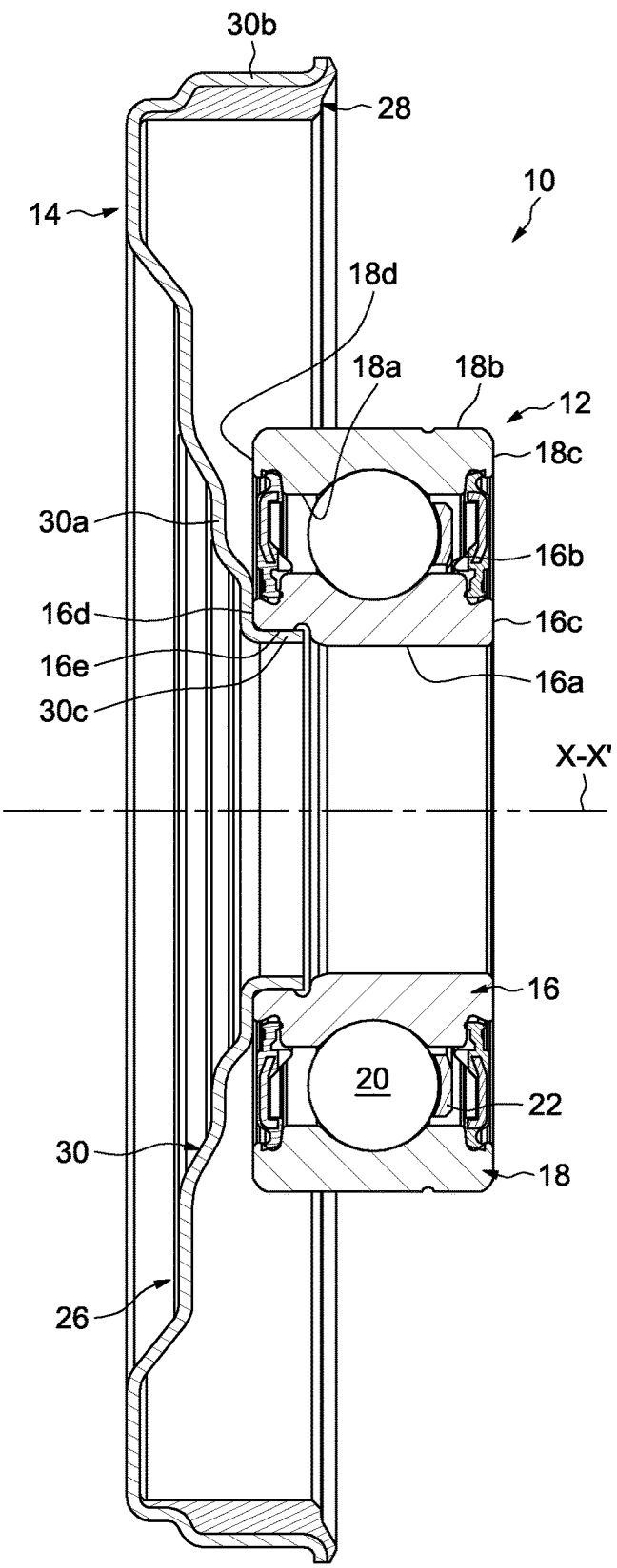
FIG. 1 is an axial section view of a sensor bearing unit according to a first example of the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by 3 at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty three-point five (33.5°) degrees. The sensor bearing unit 10 represented on FIG. 1 is adapted to equip an apparatus such as a motor, a brake system, a suspension system or any rotating machine, in particular for an automotive vehicle.

The sensor bearing unit 10 comprises a bearing 12 and an impulse ring 14 mounted on the bearing. The bearing 12 is intended to be mounted on a shaft (not shown) of the apparatus for tracking the rotation of the shaft.

The bearing 12 comprises a first ring 16 and a second ring 18. In the illustrated example, the first ring 16 is the inner ring whereas the second ring 18 is the outer ring. The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is mounted on the outer surface of the shaft of the apparatus. The inner ring 16 is intended to rotate while the outer ring 18 is intended to be fixed. The outer ring 18 can be mounted in a fixed support member or housing, belonging to the apparatus.

The outer ring 18 is provided with a cylindrical inner surface or bore 18a and with an outer cylindrical surface 18b which is radially opposite to the bore 18a. A toroidal circular raceway for the rolling elements 20 is formed from the bore 18a, the raceway being directed radially inwards. The outer ring 18 also is also provided with two opposite radial lateral faces 18c, 18d which axially delimit the bore 18a and the outer surface 18b of the ring.

Similarly, to the outer ring 18, the inner ring 16 is provided with a cylindrical inner surface or bore 16a and with an outer cylindrical surface 16b which is radially opposite to the bore 16a. A toroidal circular raceway for the rolling elements 20 is formed from the outer cylindrical surface 16b, the raceway being directed radially outwards.

The inner ring 16 also is also provided with two opposite radial lateral faces 16c, 16d which axially delimit the bore 16a and the outer surface 16b of the ring.

The inner ring 16 further comprises a cylindrical groove 16e made in the bore 16a. The groove 16e is centered on the axis X-X'. Diameter of bore 16a is smaller than diameter of groove 16e. The groove 16e opens on the radial lateral face 16d.

As will be described later, the lateral face 16d and the bore 16a of the inner ring each comprise a textured region or area to increase the breaking torque between the inner ring and the impulse ring 14.

The impulse ring 14 is mounted on the inner ring 16. The impulse ring 14 comprises an annular target holder 26 and a target 28 mounted on the target holder. In this example, the target holder 26 only comprises a flange 30 onto which is mounted the target 28.

The flange 30 is axially secured to the inner ring 16 of the bearing. The flange 30 is mounted into the bore 16a of the inner ring of the bearing. The flange 30 is axially mounted against the lateral face 16d of the inner ring. In the disclosed example, the flange 30 is made in one part. The flange 30 is made of metal.

The flange 30 comprises an annular radial portion 30a, an outer annular axial portion 30b radially surrounding the bearing 12, and an inner axial portion 30c secured to the inner ring 16 and defining the bore of the flange.

The outer axial portion 30b is located radially above the outer ring 18 of the bearing. The outer axial portion 30b extends radially a large-diameter edge of the radial portion 30a.

The radial portion 30a of the flange extends between the outer and inner axial portions 30b, 30c. The axial portion 30c extends axially inwards the radial portion 30a. The axial portion 30c extends axially a small-diameter edge of the radial portion 30a. Here, the inner axial portion 30c extends purely axially.

The radial portion 30a of the flange axially abuts against the radial lateral face 16d of the inner ring. The radial portion 30a substantially extends radially from the axial portion 30c. In the illustrated example, the radial portion 30a of the flange is provided with frustoconical parts inclined with respect to the axis X-X' towards the opposite direction of the bearing 12. Frustoconical parts prevent any interference between the flange 30 and the outer ring 18 of the bearing.

The flange 30 is axially secured to the inner ring 16 by means of the inner axial portion 30c. The inner axial portion 30c forms a fixing portion of the target holder. The axial portion 30c is mounted into the bore 16a of the inner ring of the bearing. The axial portion 30c comes into radial contact with the bore 16a.

The inner portion 30c is secured into the bore 16a. More precisely, the inner portion 30c is mounted and secured into the groove 16e of the bore. For example, the inner portion 30c of the flange may be secured into the bore 16a of the inner ring 16e, by axial press-fitting. Alternatively, the inner axial portion 30c of the target holder may be secured into the bore 16a by snapping, by gluing, by welding, by radial crimping or any other appropriate means.

The target 28 is mounted on the outer axial portion 30b of the flange. In the disclosed example, the target 28 is mounted into the bore of the outer axial portion 30b. Alternatively, the target 28 may be mounted on the outer surface of the outer axial portion 30b.

In one embodiment, the target 28 includes magnetic North and South alternated poles. The target 28 is multi-polarly magnetized in the circumferentially direction. The target 28 may be a plastic molded part. The target 28 may be overmolded onto the flange 30. Alternatively, the target 28 may be separately formed and secured onto the flange 30 by any appropriate means, for example by bonding or by press-fitting. The target 28 may be formed of a rubber material with magnetic powder, or of a magnetic alloy or of a plasto-ferrite or of an elasto-ferrite.

Detection means (not shown) are associated with the target 28 for tracking the rotation of the impulse ring 14 and the inner ring 16 around the axis X-X'. The detection means are disposed to radially face the inner surface of the target 28. For example, the detection means may include Hall-effect sensors. The target 28 is a radial target. Alternatively, the target may be an axial target.

As an alternative, the target 28 and the detection means may use any other suitable technology instead of magnetic technology. For example, induction technology or optic technology may be implemented.

Figure 2:
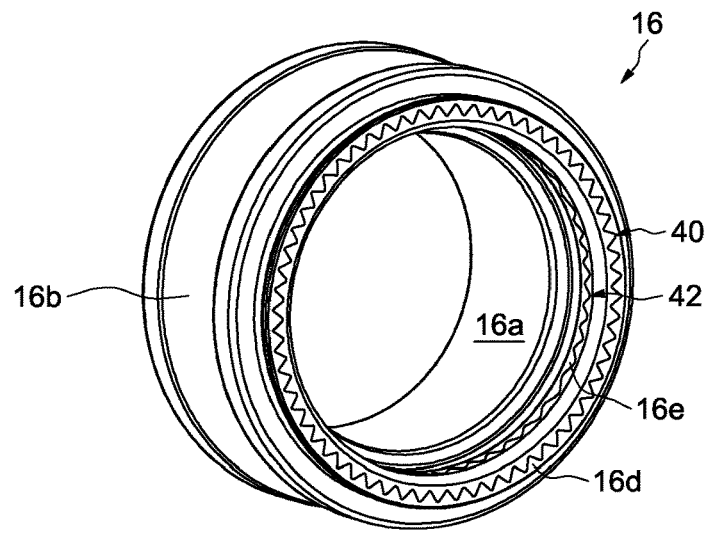
FIG. 2 is a perspective view of the inner ring of a bearing of the sensor bearing unit of FIG. 1.

As previously mentioned and shown on FIG. 2, the lateral face 16d and the bore 16a of the inner ring each comprise a textured areas 40, 42.

Each textured area 40, 42 extends circumferentially on the associated lateral face 16d or bore 16a. In the illustrated example, each textured area 40, 42 has an annular form. Alternatively, at least one of the textured areas 40, 42 may extend over a limited angular sector, for example ranging between 200° and 300°.

Figure 3:
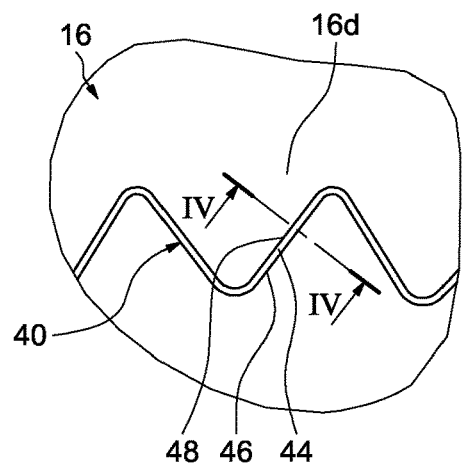
FIG. 3 is a detail view of FIG. 2.
Figure 4:
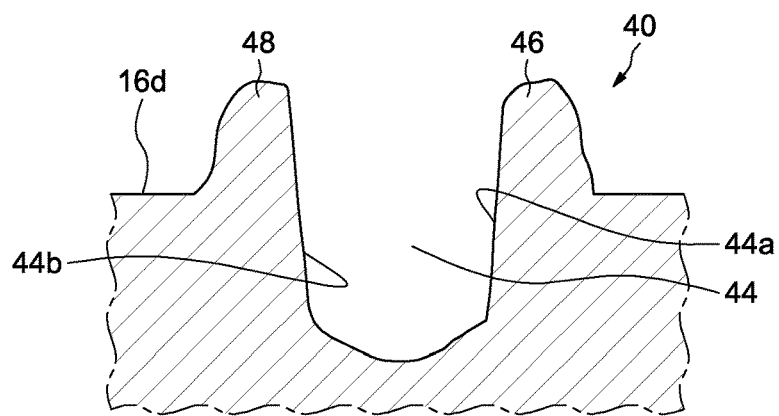
FIG. 4 is a section on IV-IV of FIG. 3.

As shown more clearly on FIGS. 3 and 4, the textured area 40 formed on the lateral face 16d of the inner ring is provided with a groove 44 and with two protrusions 46, 48 disposed one on each side of the groove 44 and extending along the groove. The groove 44 and the protrusions 46, 48 form the textured area 40.

The groove 44 extends continuously in the circumferential direction. The groove 44 extends axially inwards from the lateral face 16d of the inner ring. The groove 44 is oriented axially outwards. The groove 44 is delimited by two spaced side walls 44a, 44b facing each other.

The depth of the groove 44 may be constant or variable along the length of the groove. The width of the groove 44 may be constant or variable along the length of the groove. For example, the depth of the groove 44 may be greater or equal to the height of the protrusions 46, 48. For example, the depth of the groove 44 may range between 25 µm and 65 µm.

Each protrusion 46, 48 extends continuously in the circumferential direction along the groove 44. Each protrusion 46, 48 protrudes from the lateral face 16d of the inner ring. Each protrusion 46, 48 protrudes axially. The protrusion 46 is disposed on one side of the groove 44 and the protrusion 48 is disposed on the other side. The protrusion 46 extends the side wall 44a of the groove. The protrusion 48 extends the side wall 44b of the groove.

The height of each protrusion 46, 48 may be constant or variable along the length of the protrusion. The width of each protrusion 46, 48 may be constant or variable along the length of the groove.

For example, the height of the protrusions 46, 48 may range between 10 µm and 50 µm, and preferably between 15 µm and 38 µm. The width of the protrusions 46, 48 may range between 10 µm and 40 µm, and preferably between 15 µm and 35 µm. At the top of the protrusions 46 and 48, the space between these protrusions is less than or equal to 60 µm.

In the illustrated example, the groove 44 and the protrusions 46, 48 have a sinusoidal shape extending circumferentially. The protrusions 46, 48 and the groove 44 of the textured area 40 are formed simultaneously by local deformation of the material of the lateral face 16d of the inner ring caused by impact, preferably by the impact of a laser beam. In this case, the area 40 is a laser-generated texture area.

Referring once again to FIG. 2, the textured area 42, which is formed on the cylindrical bore 16a of the inner ring, is similar to the previously described textured area 40 with a continuous groove and with continuous lateral protrusions. More precisely, the textured area 42 is formed on the groove 16e of the bore 16a of the inner ring. The groove of the textured area 42 extends from the bore 16a and the protrusions protrudes from the bore. The groove is oriented radially inwards and each protrusion protrudes radially.

The protrusions 46, 48 of the textured area 40 formed on the lateral face 16d of the inner ring come into contact with the radial portion 30a (FIG. 1) of the flange of the impulse ring 14. The protrusions of the textured area 42 formed on the bore 16a of the inner ring come into contact with the inner axial portion 30c of the flange of the impulse ring.

Figure 5:
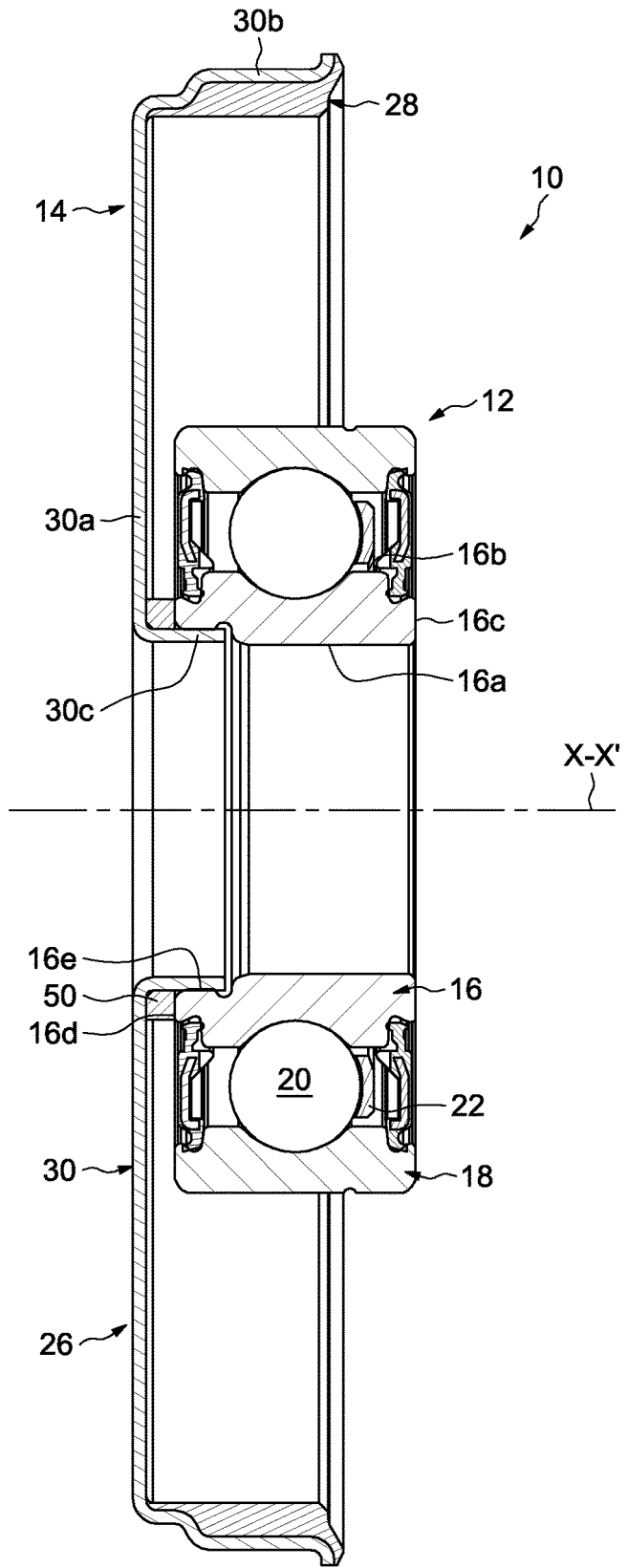
FIG. 5 is an axial section view of a sensor bearing unit according to a second example of the invention.

The textured areas 40, 42 increases the friction torque between the inner ring 16 and the impulse ring 14. The angular connection between the impulse ring 14 and the inner ring 16 is improved The second example shown on FIG. 5, in which identical part are given identical references, mainly differs from the first example in that the target holder 26 comprises the flange 30 onto which is mounted the target 28, and a washer 50 axially interposed between the radial portion 30a of the flange and the inner ring 16. The washer 50 is distinct from the flange 30.

The washer 50 is axially interposed between the radial portion 30a of the flange and the lateral face 16d of the inner ring. The washer 50 is in axial contact against the lateral face 16d of the inner ring on one side and in axial contact with the radial portion 30a of the flange on the other side. The washer 50 is mounted radially around the inner axial portion 30c of the flange.

The washer 50 is a spacer for axially shifting the flange 30 relative to the outer ring 16 of the bearing in order to avoid interferences therebetween. Accordingly, with regard to the first example, the radial portion 30a of the flange may have a simplified shape. In the illustrated example, the radial portion 30a of the flange extends purely radially.

Similarly to the first example, the lateral face 16d and the bore 16a of the inner ring are provided with the textured areas. In this example, the protrusions of the textured area provided on the lateral face 16d comes into contact with the washer 50 of the target holder.

Figure 6:
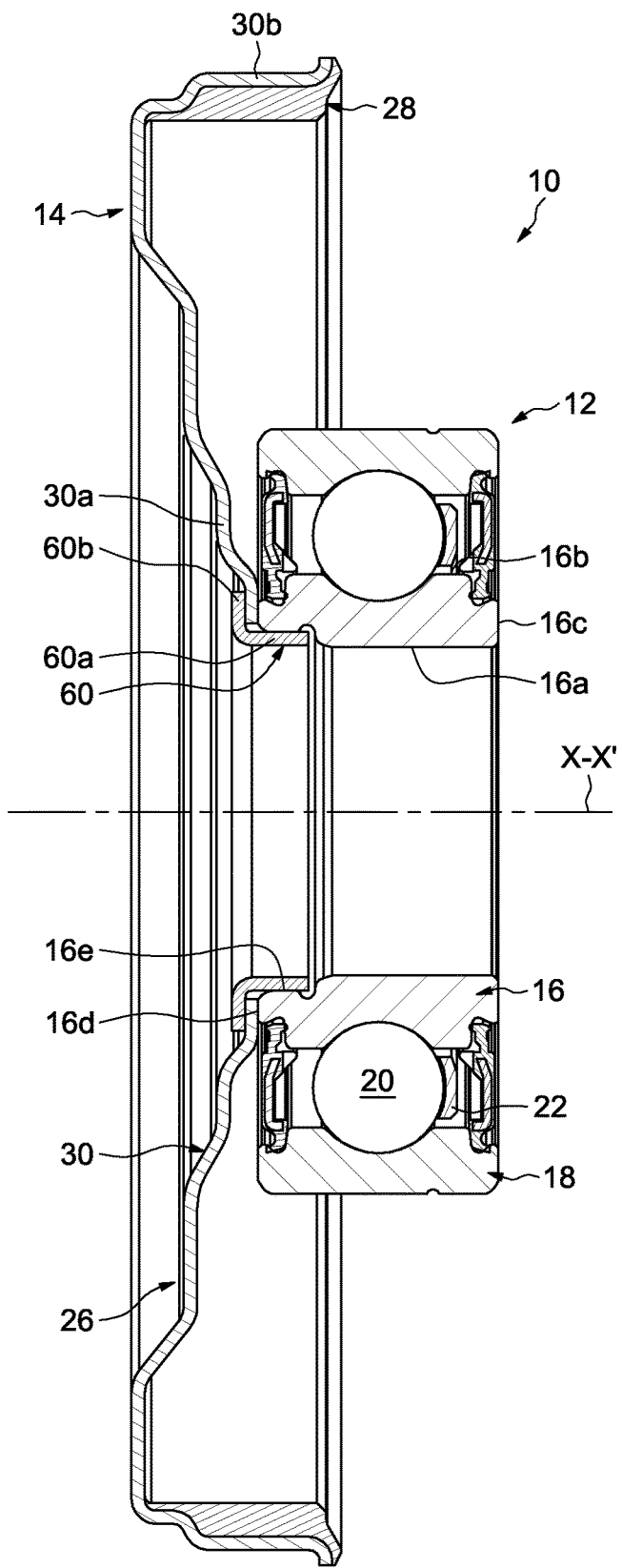
FIG. 6 is an axial section view of a sensor bearing unit according to a third example of the invention.

The third example shown on FIG. 6, in which identical part are given identical references, differs from the first example in that the target holder 26 comprises the flange 30 onto which is mounted the target 28, and a fixing sleeve 60 secured to the inner ring 16. In this example, the sleeve 60 forms a fixing portion of the target holder 26.

The flange 30 is axially secured to the inner ring 16 of the bearing by means of the sleeve 60. In this example, the flange 30 is deprived of the inner axial portion 30c. The radial portion 30a defines the bore of the flange 30.

The flange 30 is axially mounted between the lateral face 16d of the inner ring and the sleeve 60. The flange 30 is mounted radially around the sleeve 60. The radial portion 30a of the flange is axially interposed and clamped between the lateral face 16d of the inner ring and the sleeve 60. The flange 30 is in axial contact against the lateral face 16d of the inner ring on one side and in axial contact with the sleeve 60 on the other side.

The sleeve 60 is axially secured to the inner ring 16. The sleeve 60 is mounted into the bore 16a of the inner ring of the bearing. The sleeve 60 is secured into the bore 16a. More precisely, the sleeve 60 is mounted and secured into the groove 16e of the bore. For example, the sleeve 60 may be secured into the bore 16a of the inner ring 16e, by axial press-fitting. Alternatively, the sleeve 60 may be secured into the bore 16a by snapping, by gluing, by welding, by radial crimping or any other appropriate means. In the disclosed example, the sleeve 60 is made in one part. The sleeve 60 is be made of metal.

The sleeve 60 comprises an annular axial portion 60a defining the bore of the sleeve, and an outer radial collar or portion 60b extending radially from the axial portion 60a. The radial portion 60b extends radially outwards from the axial portion 60a. The portion 60b extends an axial end of the axial portion 34a.

The flange 30 is mounted radially around the axial portion 60a of the sleeve. The radial portion 30a of the flange is mounted radially around the axial portion 60a. An annular radial gap (not referenced) subsists between the bore of the flange 30 and the axial portion 60a of the sleeve. The axial portion 60a of the sleeve is secured to the inner ring 16 of the bearing. The axial portion 60a of the sleeve forms a fixing portion of the target holder. The axial portion 60a is mounted and secured into the bore 16a of the inner ring of the bearing. More precisely, the axial portion 60a of the sleeve is mounted and secured into the groove 16e of the bore. The axial portion 60a comes into radial contact with the bore 16a.

The flange 30 is axially interposed and clamped between the lateral face 16d of the inner ring and the radial portion 60b of the sleeve. The radial portion 60b axially abuts against the radial portion 30a of the flange.

In this example, the protrusions of the textured area formed on the lateral face 16d of the inner ring come into contact with the radial portion 30a of the flange of the impulse ring 14. The protrusions of the textured area formed on the bore 16a of the inner ring come into contact with the axial portion 60a of the sleeve of the impulse ring.

In the illustrated examples, each textured area 40, 42 has a sinusoidal shape extending circumferentially on the associated lateral face 16d or bore 16a of the inner ring. This increases the contact surface between the textured areas 40, 42 of the inner ring and the impulse ring 14. Alternatively, the textured areas 40, 42 may have different shape. For example, the textured areas 40, 42 may have a circular shape.

In the illustrated examples, both the lateral face 16d and the bore 16a of the inner ring comprise a textured area 40, 42. Alternatively, only the lateral face 16d or the bore 16a may comprise a textured area.

Otherwise, as previously mentioned, in the illustrated examples, the first ring of the rolling bearing is the inner ring whereas the second ring is the outer ring. As an alternative, it could be possible to provide a reversed arrangement with the first ring forming the outer ring and the second ring forming the inner ring. In this case, the impulse ring 14 is secured to the outer ring 18, and at least one of the outer surface 18b and the lateral face 18c or 18d of the outer ring is provided with the textured area.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

In the previous examples, an impulse ring 14 is secured to the inner or outer ring of the bearing which is provided with the textured area(s) 40, 42. Alternatively, the textured area(s) may be provided on the inner or outer ring in order to improve the angular connection with another part, for example a sensor body, a seal, etc.

The invention claimed is:
1. A bearing comprising:
a first ring, and
a second ring centered on an axis, each of the first and second rings being provided with an outer cylindrical surface, with an inner cylindrical surface, and with lateral faces that axially delimit the outer and inner cylindrical surface, wherein
the inner and outer cylindrical surfaces and/or one of the lateral faces of the first ring comprise a textured area provided with a groove extending circumferentially and with two protrusions disposed one on each side of the groove and extending along the groove.

2. The bearing according to claim 1, wherein the textured area is formed by local deformation of the inner and outer cylindrical surfaces or the lateral face.

3. The bearing according to claim 1, wherein the textured area has a sinusoidal shape extending circumferentially.

4. The bearing according to claim 1, wherein the height of the protrusions of the textured area ranges between 10 μm and 50 μm.

5. The bearing according to claim 4, wherein the height of the protrusions of the textured area ranges between 15 μm and 38 μm.

6. The bearing according to claim 1, wherein the width of the protrusions of the textured area ranges between 10 μm and 40 μm.

7. The bearing according to claim 6, wherein the width of the protrusions of the textured area ranges between 15 μm and 35 μm.

8. The bearing according to claim 1, wherein the space between the protrusions of the textured area, at their top, is less than or equal to 60 μm.

9. A sensor bearing unit comprising:
a bearing having a first ring, and a second ring centered on an axis, each of the first and second rings being provided with an outer cylindrical surface, with an inner cylindrical surface, and with lateral faces that axially delimit the outer and inner cylindrical surfaces, wherein the inner and outer cylindrical surfaces and/or one of the lateral faces of the first ring comprise a textured area provided with a groove extending circumferentially and with two protrusions disposed one on each side of the groove and extending along the groove, and
an impulse ring provided with a target holder and with a target mounted on the target holder, the target holder being axially mounted against the lateral face of the first ring and comprising an axial fixing portion secured to the first ring and coming into radial contact with the cylindrical surface of the first ring.

10. The sensor bearing unit according to claim 9, wherein the target holder of the impulse ring comprises at least a flange onto which is mounted the target, the flange comprising an axial portion forming the axial fixing portion of the target holder.

11. The sensor bearing unit according to claim 10, wherein the flange of the target holder further comprises a radial portion extending at least radially from the axial portion and coming into axial contact with the lateral face of the first ring.

12. The sensor bearing unit according to claim 9, wherein the target holder of the impulse ring comprises at least a flange onto which is mounted the target and a sleeve, the sleeve comprising an axial portion forming the axial fixing portion of the target holder, the flange being axially interposed between the lateral face of the first ring and the sleeve and being radially mounted around the sleeve.

* * * * *